(12) United States Patent
Padden et al.

(10) Patent No.: US 9,622,255 B2
(45) Date of Patent: Apr. 11, 2017

(54) NETWORK TRAFFIC PRIORITIZATION

(75) Inventors: Joseph Padden, Boulder, CO (US); Jennifer Andreoli-Fang, Boulder, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 1234 days.

(21) Appl. No.: 13/537,707

(22) Filed: Jun. 29, 2012

(65) Prior Publication Data
US 2014/0003336 A1 Jan. 2, 2014

(51) Int. Cl.
| | | |
|---|---|---|
| *H04W 72/10* | (2009.01) | |
| *H04L 29/08* | (2006.01) | |
| *H04W 84/12* | (2009.01) | |
| *H04W 28/18* | (2009.01) | |
| *H04W 74/08* | (2009.01) | |
| *H04L 12/801* | (2013.01) | |

(52) U.S. Cl.
CPC .......... *H04W 72/10* (2013.01); *H04L 67/322* (2013.01); *H04W 28/18* (2013.01); *H04W 74/0875* (2013.01); *H04L 47/14* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 6,704,932 B1* | 3/2004 | Matsunaga | ............. | H04L 12/44 348/E7.071 |
| 2003/0200306 A1* | 10/2003 | Park | ................... | H04L 12/2803 709/224 |
| 2004/0071154 A1* | 4/2004 | Wentink | ............ | H04L 12/40143 370/448 |
| 2006/0034248 A1* | 2/2006 | Mishra | .................. | H04L 1/1628 370/349 |
| 2007/0217378 A1* | 9/2007 | Moorti | ................. | H04L 1/1607 370/338 |
| 2008/0117836 A1* | 5/2008 | Savoor | ................ | H04L 41/0896 370/254 |
| 2009/0252053 A1* | 10/2009 | Leith | ..................... | H04W 24/10 370/252 |
| 2009/0279427 A1* | 11/2009 | Ji | ...................... | H04W 74/0816 370/230 |
| 2010/0182959 A1* | 7/2010 | Cook | .................... | H04M 11/062 370/329 |
| 2012/0224484 A1* | 9/2012 | Babiarz | .............. | H04L 41/5019 370/235 |
| 2013/0051318 A1* | 2/2013 | Matsuo | .................. | H04B 15/02 370/328 |
| 2013/0208607 A1* | 8/2013 | Abraham | .......... | H04W 74/0816 370/252 |
| 2013/0301631 A1* | 11/2013 | Hegde | .................. | H04W 16/14 370/345 |

* cited by examiner

*Primary Examiner* — Ayaz Sheikh
*Assistant Examiner* — Mariela Vidal Carpio
(74) *Attorney, Agent, or Firm* — Great Lakes Intellectual Property, PLLC

(57) ABSTRACT

Network prioritization is contemplated. The network prioritization may relate to prioritizing consumption of network services as a function of user priority. The user priority may be associated with the devices desiring consumption of network services in order to ensure higher priority users are granted network resources over lower priority users.

18 Claims, 3 Drawing Sheets

NETWORK TRAFFIC PRIORITIZATION

TECHNICAL FIELD

The present invention relates to prioritizing network traffic, such as but not necessarily limited to prioritizing use of a upstream traffic relative to an access point.

BACKGROUND

Network traffic prioritization generally relates to coordinating use of network resources consumed when facilitating electronic communications amongst a plurality of devices. Network traffic prioritization may be desirable for virtually any type of network, such as a cable network, a hybrid fiber coaxial (HFC) network, a cellular network, an optical network, a wireless or Wi-Fi network, a wireline network or other types of network where bandwidth available to support desired communications may be insufficient or unduly constrained if a certain number or all of the devices were to attempt communications at the same time. The ability to prioritize network traffic may be beneficial in allocating network resources to ensure subscribers receive access to a purchased or agreed upon amount of bandwidth (e.g., maintaining a desired quality of service (QOS)). Some networks may be unable to support or may experience detrimental effects when more than a certain number of devices are consuming or attempt to consume network resources at the same time. The ability to prioritize network traffic may be beneficial in allocating network resources to selectively control the number of devices consuming network received at the same time.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
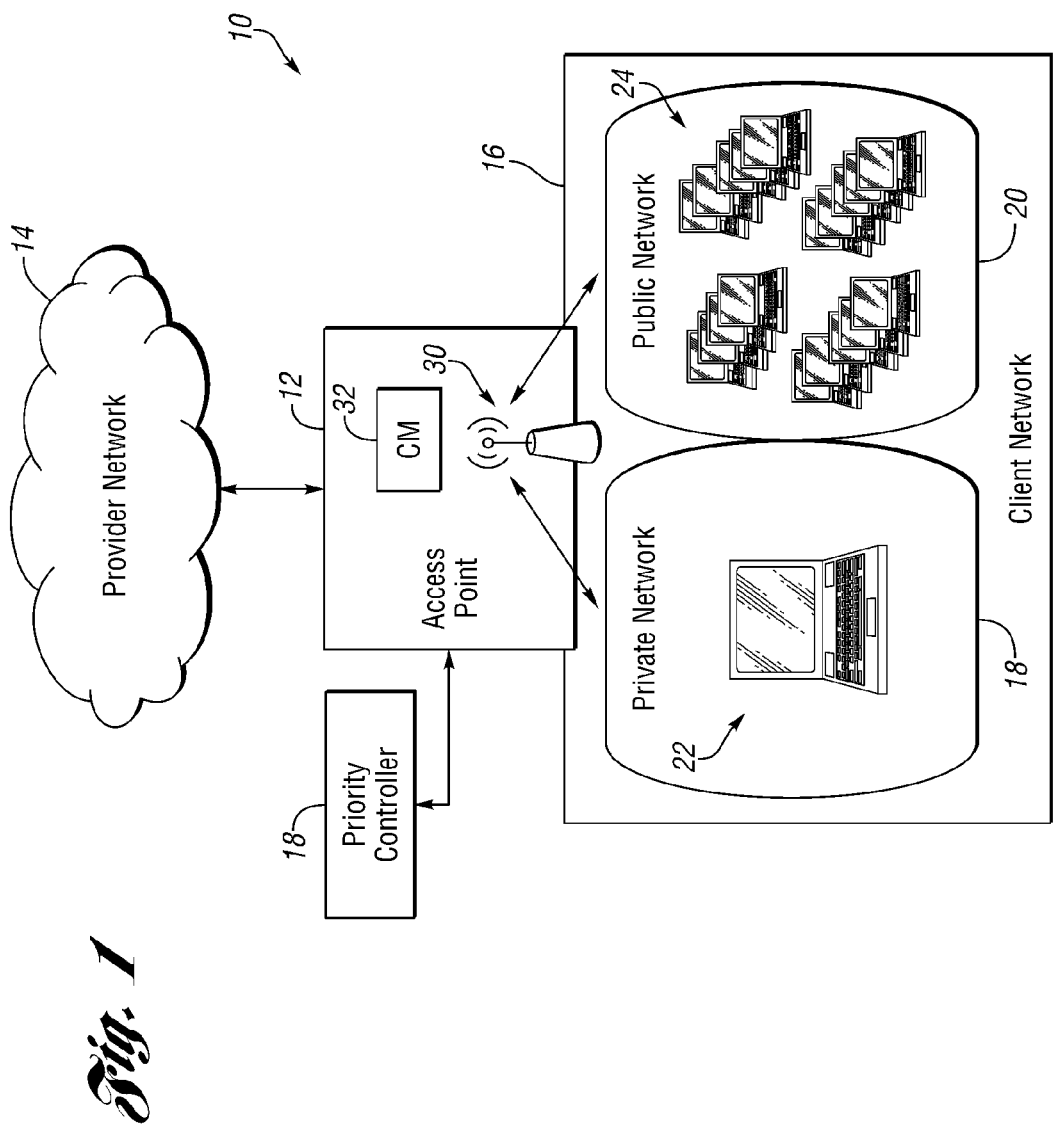
FIG. 1 illustrates a system having network prioritization in accordance one non-limiting aspect of the present invention.

FIG. 1 illustrates a system 10 having network prioritization in accordance one non-limiting aspect of the present invention. The system 10 is shown to include an access point 12 configured to facilitate network-based communications between a provider network 14 and a client network 16. A priority controller 18 may be included to facilitate prioritizing usage of bandwidth or other resources related to facilitating communications between the provider network 14 and the client network 16. The provider network 14 may relate to any type of network, including cable network, a hybrid fiber coaxial (HFC) network, a cellular network, an optical network, a wireless or Wi-Fi network, a wireline network or other types of network supported by a service provider in multiple system operator (MSO), such as one provided by a television service provider, a broadcast service provider, a satellite service provider, a cellular telephone service provider, a voice over Internet protocol (VoIP) service provider, an Internet service provider (ISP), etc. The client network 16 may correspond with a local wireless or wireline network supported at a location of a subscriber of the service provider.

The client network 16 is shown to be divided into a private network 18 and a public network 20. The private network 18 may correspond with a home network or other network having enhanced security or other limitations which require authorization or other consent prior to a device 22 being granted access. The public network 20, in contrast, may correspond with a home network or other network, such as a Wi-Fi hotspot, associated with the same access point 12 but which does not include the same security or other limitations on devices 24 authorized for access. This type of arrangement may be common where a subscriber desires to support private networking with a first plurality of users and their associated devices 22 while at the same time supporting public or community networking with a second plurality of users and their associated devices 24. Such an environment of use may correspond with a wireless network, particularly with a wireless network that supports roaming, since such networks may experience situations in which devices 22, 24 are frequently added and removed from the network, particularly when the public network 20 is unsecured or otherwise easily accessible.

While the public network 20 and the private network 18 are shown to be singular. The networks 18, 20 may be further sub-divided and/or both networks 18, 20 may be private. The use of two private networks 18, 20 may be beneficial in a situation in which the access point 12 is associated with a service provider (not shown) having capabilities to provide wireless or other network access at multiple client locations. In this type of arrangement, the service provider may be desired to provide secure or private access for subscribers that roam from one of the provider's subscriber locations to another one of the provider's subscriber locations, e.g., a subscriber of network services may be enabled to access purchased services at another subscriber's location upon completion of a roaming operation or sign-on operation. U.S. patent application Ser. No. 13/423,359, the disclosure of which is hereby incorporated by reference in its entirety, relates to one type of roaming operation where a device is able to move between subscriber locations with zero sign-on (ZSO).

The access point 12 is shown to include a single antenna or radio interface 30 for supporting wireless (illustrated) or wireline signaling associated with both of the private and public networks 18, 20. The antenna 30 is shown to interface with a cable modem 32 or other gateway operable to interface with the provider network 14. The antenna 30 may be configured to interface signaling between the various devices 22, 24 and the cable modem 32 for transmission between the provider 14 and client network 16. The single antenna 30 is illustrated to demonstrate one non-limiting aspect of the present invention where network prioritization is particularly relevant due to the single antenna 30 optionally being required to simultaneously share available upstream bandwidth communications with the devices 22, 24. While the present invention applies equally to multiple antenna configurations or access points 12 having other configurations where multiple devices may be enabled to communicate with the provider network 14 at the same time, the illustrated single antenna environment is particularly illustrated since it presents a problem where a plurality of user devices 22, 24 share a common radio interface i.e. a common resource governed by a contention based access method, such as in the manner described in CableLabs Wireless Specifications, Wi-Fi Requirements For Cable Modem Gateways, WR-SP-WiFi-GW-I02-120216, the disclosure of which is hereby incorporated by reference in its entirety.

The priority controller 18 may be configured to facilitate prioritizing consumption of network resources (e.g., upstream bandwidth) according to characteristics of the devices 22, 24 connected to the private and public networks 18, 20 and/or according to content/media for which network resources are desired. The consumption of network resources is predominately described with respect to consumption of upstream bandwidth as there may be sufficient downstream bandwidth to support simultaneously communicating with multiple devices. The upstream bandwidth may correspond with an upstream path defined from the access point 12 to the provider network 14 and/or a path defined from the devices 22, 24 to the access point 12. As is common in HFC and other systems where greater volumes of traffic are carried in a downstream direction, a greater amount of bandwidth may be allocated for downstream communications, i.e. in a direction from the provider network 14 to the client network 16, than that which is allocated for upstream communications, i.e. in a direction from the client network to the provider network. The present invention, however, applies equally to prioritizing communications in either one of the upstream and downstream directions, and as such, the present invention is not necessarily limited to prioritizing upstream communications. The priority controller 18 is shown to be a standalone entity but it may be included as part of the access point 12 and/or a device of the provider network 14 or client network 16.

The priority controller 18 may include a non-transitory computer-readable medium operable with a processor wherein the computer-readable medium includes computer-readable code embodied therein having instructions sufficient for facilitating the contemplated network prioritization. The priority controller 18 may be configured in this manner to facilitate instructing the access point 12 and/or one or more of the devices 22, 24 to facilitate the contemplated network prioritization. One non-limiting aspect of the present invention contemplates allocating bandwidth equally between each of the devices 22, 24 connected to the private and public networks 18, 20 in an unbiased manner. This may include allowing each device 22, 24 equal time to the upstream bandwidth such that the bandwidth is fairly distributed amongst all devices 22, 24. The illustrated configuration shows a single device 22 being connected to the private network 18 and 20 devices 24 being connected to the public network 20. In this arrangement, the equal or unbiased participation strategy would essentially divide the available bandwidth equally between each device 22, 24 such that each device 22, 24 receives ½ of the upstream bandwidth.

Another non-limiting aspect of the present invention contemplates an inequitable or biased manner of prioritizing, allocating, distributing, purchasing or otherwise proportioning network resources such that certain devices 22, 24 are provided priority over other devices 22, 24. This type of prioritization strategy may be beneficial over an unbiased or equal sharing type of strategy since it may be useful in allowing the service provider or operator of the client network 16 to identify certain devices 22, 24 for enhanced access or greater access to network resources. In the illustrated configuration, this prioritization strategy contemplates deviating from a 1 to 21 allocation of available bandwidth to a customized allocation. The customized allocation may include proportioning bandwidth between the private and public networks 18, 20, e.g., providing each network 18, 20 with half of the available bandwidth or some other portion, such as a 75/25 split, such that devices 22, 24 within each network are allocated access to some portion of that network's allocation, e.g., each network's allocation may be shared equally or unequally between the connected devices 22, 24. Optionally, the participation may also include allocating bandwidth to the devices 22, 24 is individually or independently of the network 18, 20 to which they are connected. This may allow the priority controller 18 to specify or allocate bandwidth particularly to each device 22, 24.

The ability to individually prioritize use of network resources for each of the devices 22, 24 may be beneficial in the illustrated configuration where the single antenna 30 is used to support multiple networks 18, 20, i.e., the private and public networks 18, 20, but such a prioritization strategy may also be beneficial in an environment where the access point 12 supports a single network or multiple antennas are included or multiple networks. One non-limiting aspect of the present invention contemplates prioritizing network resources according to the content or media desired for access by the requesting device. This capability may be beneficial in allocating or prioritizing more bandwidth to devices 22, 24 which are accessing important content or media, e.g. video or voice, over devices which are accessing less important content or media or content that is more tolerant to slower data rates, e.g., data download. The ability to prioritize services may also be beneficial in allowing Dad to prioritize his computer over the kids computers. The ability to tailor network resources according to the content/media been accessed may be beneficial; however, it may require the priority controller or other network resource to monitor the media/content being accessed. This can be a cumbersome, particularly if such a device 18 is required to keep track of values or other representations regarding the prioritization of each particular type of media/content since the quantity and volume of contents may be relatively large and require vast amounts of data input and storage in order to represent its priority.

One non-limiting aspect of the present invention contemplates prioritizing network resources according to a user associated with each device 22, 24. This may include grouping the users into one of the plurality of user groups where each user group is assigned a certain priority. This type of allocation may be beneficial over media/content allocation since it eliminates the need to identify the media/content being accessed. The user identification may occur upon connection or authentication of the device 22, 24 with the client network 16, such as part of a ZSO or other sign-on operation. Optionally the user identification may include a relation to subscription services or other factor that may be useful in identifying users having priority over other users, i.e., users that purchase higher QOS or greater tiers of service may be granted priority over other users. One such type of user grouping may correspond with determining whether the associated device 22, 24 is connected to the private network 18 or the public network 20, i.e., the device 22, 24 may be included within a private designated user group if connected to the private network 18 and within a public designated user group if connected to the public network 20. Optionally, a service set identifier (SSID) used to identify each of the private network 18 and the public network 20 may be inspected to determine whether a user of a device 22, 24 should be within the private designated user or the public designated user group.

Any number of user group designations may be included in order to facilitate providing stratification or otherwise differentiating priority of one user/device 22, 24 over another. This may include one or more of the user groups having subsets. In the illustrated public and private designated user groupings, each user may be assigned to a sub grouping, e.g., certain users may be included within a higher subgrouping than others in order to prioritize them. Alternatively, rather than relying on sub groupings, the users may be associated with priority values. The priority values may be assigned as a function of the currently connected devices 22, 24 and/or allocated periodically, such as when a new device 22, 24 connects the access point 12 or other location associated with the service provider. Users may be shuffled between a high priority group and a low priority group periodically to achieve a desired bandwidth division ratio set by the policy. The shuffling may be based on a non-use period such devices are granted access to bandwidth after a period of non-use to insure devices 22, 24 are not starved of access. The shuffling may also be based on content being requested for transmission such that higher priority content may be transmitted over lower priority content even though it is being requested by a lower priority device. Once priority values are assigned to each user/device 22, 24 desiring consumption network resources, a priority ranking may occur where devices 22, 24 having higher priority values are ranked to use network resources ahead of devices 22, 24 having lower priority values. The priority controller 18 may implement a private value policy according to a ranking algorithm or other feature to facilitate processing the various priority rankings and organizing/optimizing them in a manner sufficient to identify the one or more devices 22, 24 authorized to communicate a particular point in time.

Figure 2:
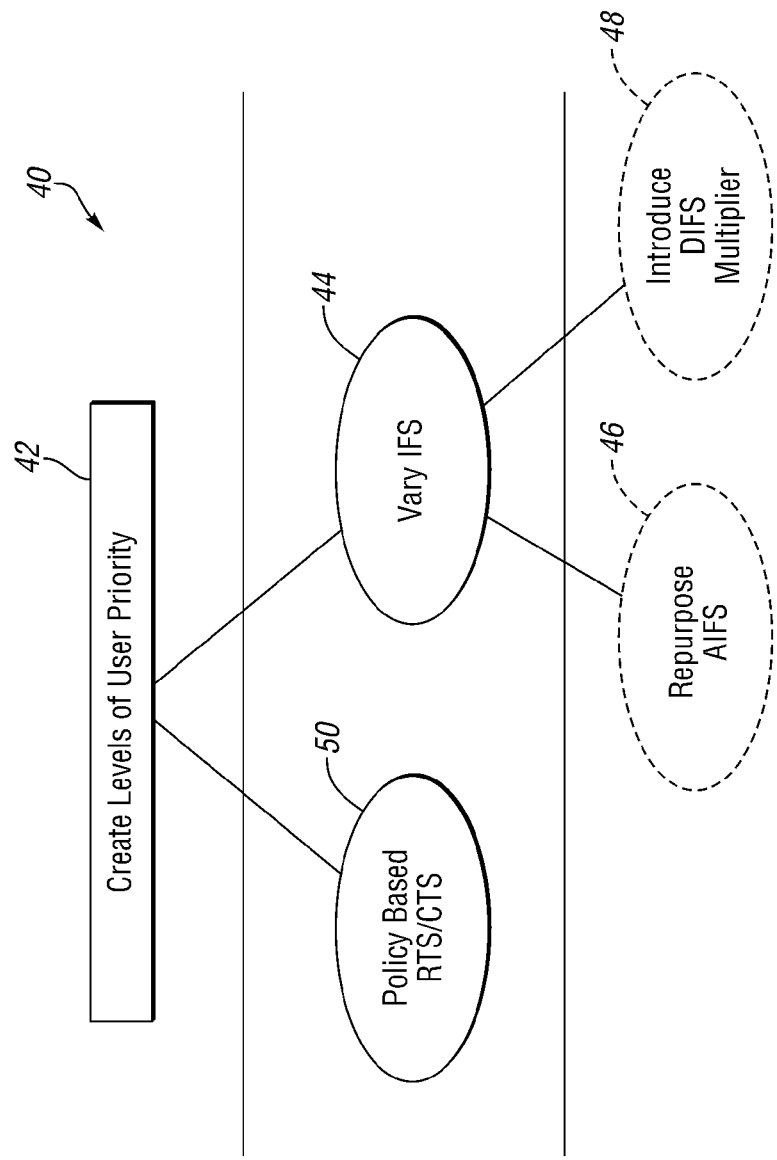
FIG. 2 illustrates a flowchart of a method of prioritizing network services in accordance with one non-limiting aspect of the present invention.

FIG. 2 illustrates a flowchart 40 of a method of prioritizing network services in accordance with one non-limiting aspect of the present invention. Block 42 relates to facilitate prioritizing usage of upstream bandwidth or other network resources according to user priority. The user priority may be based on user associated with devices attempting to consume network resources. As noted above, the user priority may be based on priority values or other factors individually organized according to a user of the connected device. Various grades of priority may be designated in order to facilitate prioritizing one user or one user device over another user or another user device. The method illustrated in FIG. 2 provides additional detail regarding process or operations that may be undertaken to facilitate the contemplated network prioritization. While the noted processes are provided, additional processes or means for prioritizing one user over another or for coordinating execution of a corresponding priority ranking may be implemented without deleting from scope contemplation of the present invention.

Block 44 relates to implementing an interframe spacing (IFS) policy. The IFS policy may be implemented with the priority controller providing corresponding instructions to the access point and/or the devices. The IFS policy relates to controlling the devices or instructing the devices to control themselves in a manner which prioritizes or otherwise controls their access to upstream bandwidth. Various wireless networking protocols, such as but not necessarily limited to Zig-Bee (ZigBee RF4CE Specification Version 1.0, ZigBee Document 094945r00ZB, Mar. 17, 2009) , 802.11 WiFi (IEEE: "Wireless LAN Medium Access Control (MAC) and Physical Layer (PHY) Specifications", IEEE Std. 802.11-2012) the disclosure of which are hereby incorporated by reference in their entirety, may rely upon IFS to ensure a single device transmits data to consume upstream bandwidth at one time. The IFS policy generally relates to assigning each device desiring transmission a period of time in which they must listen and wait before deciding the channel is clear for transmission, which may correspond with transmission/completion of a frame. This period may be generally referred to as an IFS or IFS interval. IFS is a method used in a contention based medium access protocols for governing access to the medium.

Figure 3:
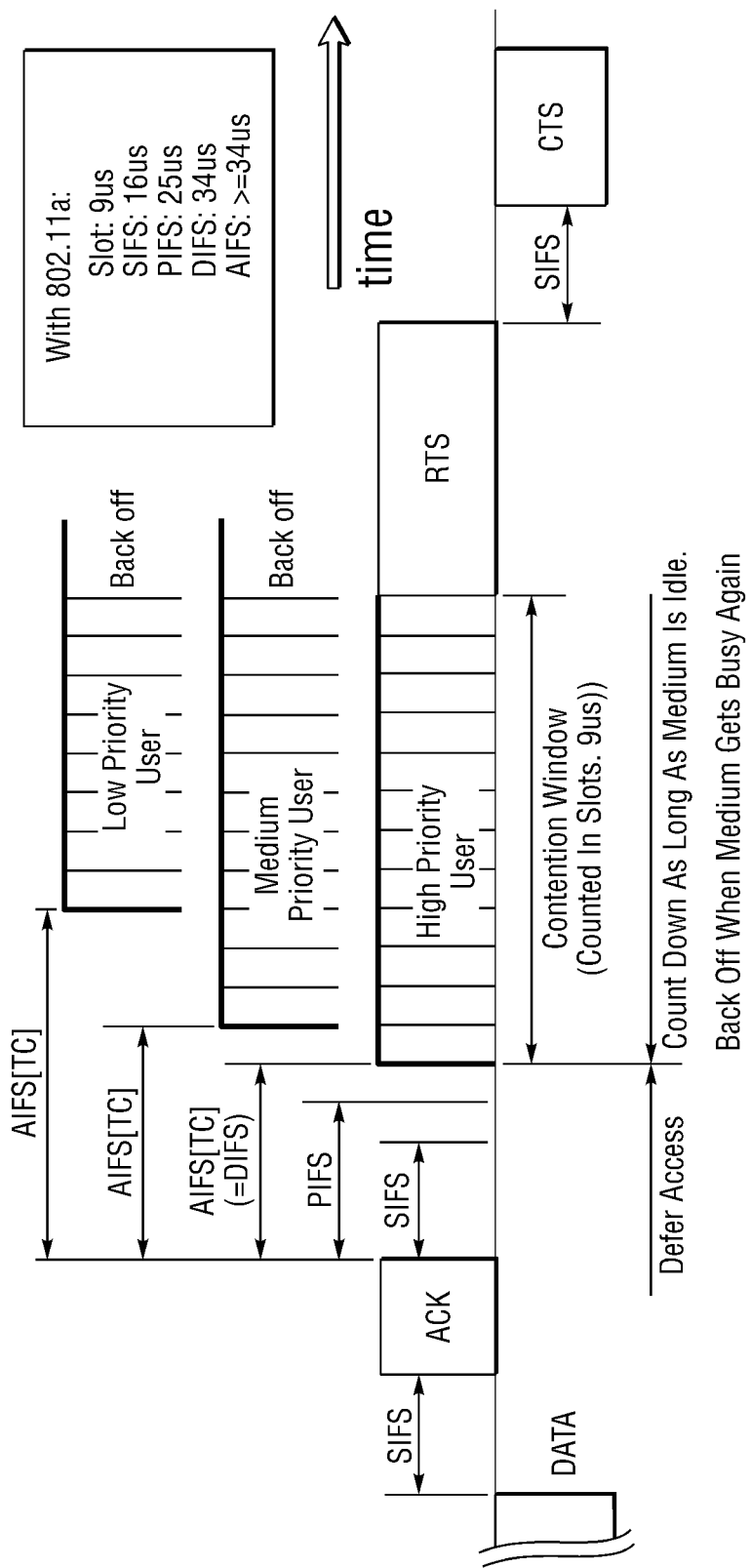
FIG. 3 illustrates use of interframe spacing in accordance with one non-limiting aspect of the present invention.

Block 46 relates to implementing the IFS policy according to a repurposed policy. The repurposed policy may relate to specifying IFSs according to a user of the corresponding user device. This may include specifying IFSs is such that devices associated with higher priority values are provide a shorter IFS than devices associated with lower priority values. FIG. 3 illustrates use of IFS according to IEEE 802.11 where certain IFSs may be repurposed in accordance with one non-limiting aspect of the present invention. The repurposed policy may include repurposing IFSs according to associated user in order to facilitate user-based prioritization of network resources. The illustrated description with respect to 802.11 is provided for non-limiting and exemplary purposes as being representative of one type of protocol which relies upon IFS. The present invention fully contemplates its use and application with any protocol or any environment employing IFS or an analogous timing or spacing methodology may be employed to control signal transmissions and/or messaging.

The IFSs may include a short interframe space (SIFS), a distributed (coordination function) interframe space (DIFS), a point (coordination function) interframe space (PIFS), and an arbitration interframe space (AIFS). The SIFS may be used to separate frames being transmitted by a single user in succession and/or the required acknowledgement frame transmitted by the receiving station of a transmission. The DIFS may be used to separate transmissions between two distinct users on a common contention based transmission medium governed by a distributed coordination function. The PIFS may be used to separate transmissions between two distinct users on a common contention based transmission medium governed by a point coordination function during the contention free period (CFP). The AIFS may be used to provide differing access priority to the contention based transmission medium based on some selection criteria e.g. traffic type, client SSID association, user identity, etc.

The AIFSs may be associated with one or more of the user groups in order to facilitate prioritizing the users associated there with. As shown, three priority groups are illustrated, including a high priority user, a medium priority user, and a low priority user. Users may be categorized within each of these user groups according to information exchange with access point at the time of connection and/or after the time of connection should the operations of the devices change. A user device associated with the higher priority grouping may be assigned a shorter AIFS than those associated with the medium and low priority user groupings in order to facilitate prioritizing their transmissions over the other user groups. In the event multiple users are included within one or more of the user groups, a contention window may be assigned to each of the user's to prioritize them relative to the other users within the same user group. The contention windows are illustrated for exemplary non-limiting purposes to correspond with 9 µs slots counted relative to an AIFS associated with the corresponding user group. Upon expiration of the corresponding IFS and/or contention window, the corresponding device may be authorized to transmit i.e., to consume network resources.

Returning to FIG. 2, Block 48 relates to implementing the IFS policy according to a multiplier policy. The multiplier policy may include adding a multiplier to an interframe spacing value (IFS) selected by the devices to use the upstream bandwidth. The multiplier may be used to set an IFS and/or to adjust an IFS previously set for each device desiring consumption of network resources. The selected multiplier may be determined by the priority controller for each device according to its corresponding priority value such that devices associated with higher priority values are provided lower multipliers than devices with lower priority values. For exemplary, non-limiting purposes, the multiplier is shown to be used with DIFSs assigned to each of the devices. The multiplier may be used to multiply the DIFS value according to the associated users priority so that higher priority users have precedence over lower priority users. During the client association process with an access point, a DIFS Multiplier (DIFSM) may be exchanged which the client then uses in conjunction with Carrier Sense Multiple Access with conditional access (CSMA/CA) algorithm/specification, the disclosure of which is hereby incorporated by reference in its entirety. Any time the client uses the DIFS, the client would instead use the DIFS×DIFSM to determine the proper interframe space.

Block 50 relates to a user prioritization strategy according to a request to send (RTS)/clear to send (CTS) policy. The RTS/CTS policy may be based requiring the devices to transmit a RTS message and to receive a CTS message prior to being authorized to consume network resources, i.e., to transmit upstream messages. This may include a priority controller instructing an access point to control issuance of the CTS messages according to the priority values of the associated devices such that the CTS messages associated with higher priority devices are issued prior to CTS messages associated with lower priority devices. FIG. 3 illustrates the RTS message and the CTS message. As seen in the FIG. 3, after a device has waited the appropriate IFS+CW but prior to sending a data packet, the device sends an RTS packet to the intended receiver. Upon receipt of an RTS frame the receiver waits for a period of time equal to a SIFS then responds with a CTS message if the receiver is available for communication. After the receipt of a CTS message the transmitting device can precede with sending data frames. If the CTS is not received the transmitting device must wait the proper IFS before attempting to send another RTS. With this approach, a two-phased approach may be implemented to allow an access point to structure and enforce priority and bandwidth on the uplink air interface. A policy based RTS/CTS mechanism may be used for larger transmissions, i.e., those above a threshold selected by the client device, priority controller, and/or the access point. At the same time, a default level of priority can be given to specific client, or a specific group of clients, that applies to all transmission opportunities regardless of the size of the intended transmission. In the event the RTS/CTS mechanism has a transmission size threshold that is configured in the client, to ensure priority is applied to small packets as well as large, one non-limiting aspect of the present invention contemplates a modification to the DIFS.

As supported above, one non-limiting aspect of the present invention contemplates a mechanism for provisioning and enforcing up-link traffic priority and bandwidth allocation given to a client or group of clients, including one which is sufficient for use with an 802.11 configured network. This may include configuring and enforcing traffic priority levels and bandwidth allocation, including providing clients differing levels of access to a transmission channel. A RTS/CTS mechanism, Request-To-Send and Clear-To-Send, can be configured to allow an access point to make a policy based decision rather than putting the decision making on the client by simply using a medium based decision, i.e. sensing whether the medium is clear for transmission. In this way, when a specific client, or a client from a specific group e.g. a client on a given SSID, an 802.11b client, etc., sends an RTS to the access point, the access point could use a set of rules from a preconfigured or dynamically created policy, as well as the medium status as the basis for the decision of whether to reply with a CTS or not. In this way, the access point could enforce increased management the air interface uplink bandwidth and resources.

One non-limiting aspect of the present invention contemplates enforcing priority or scheduling in the uplink of an 802.11 network. The media access mechanism, CSMA/CA, may be designed to prioritize use according to user groups or other grouping instead of allowing fair access to the media, e.g., instead of allowing each device connected to the network equal access or limiting access according to media content type been transmitted, one non-limiting aspect of the present invention contemplates joining access according to user or a grouping of the user. This capability may be declared beneficial in scenarios in which multiple clients or networks share a single transmission channel. In these scenarios it may be beneficial to allow priority access to a given client or group of clients. This invention is particularly applicable and key to the MSOs who deploy or will deploy community Wi-Fi where the broadband subscriber's uplink wireless traffic should take priority over the public roaming traffic, such as to ensure subscription-based subscribers are provided greater priority or greater access than roaming or public (i.e., nonpaying) users.

The present invention may be beneficial with operators having capabilities to deploy community Wi-Fi products in which a MSO-controlled residential Wi-Fi AP broadcasts 2 or more SSIDs from a single radio interface. Due to the single radio interface, the SSIDs will be competing for transmission time on a common RF channel. One non-limiting aspect of the present invention contemplates providing a solution sufficient for the MSOs to control provisioning and enforcing priority and bandwidth allocation in this scenario with minimal changes to the client device. With minimal changes to the client device a greater number of clients may be affected thus improving the performance of this method.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of prioritizing bandwidth for an access point configured to provide a wireless network for a plurality of devices, the method comprising:

associating one of a plurality of interframe spacing (IFS) values with each of a plurality of user groups such that at least a first IFS value of the plurality of IFS values associated with a first group of the plurality of user groups is less than a second IFS value of the plurality of IFS values associated with a second group of the plurality of user groups due to the first group having higher priority than the second group;

assigning one of the plurality of IFS values to each of the devices when executing an authentication process necessary for obtaining access to the wireless network, wherein the assigning includes selecting the one of the plurality of IFS values assigned to each device as the one of the plurality of IFS values associated with the user group of a user identified during the authentication process as being associated therewith;

applying a multiplier to one or more of the devices after completing the authentication process, each one or more multiplier being a numerical value greater than zero to be multiplied with the one of the plurality of IFS values previously assigned to the corresponding device, thereby adjusting the previously assigned one of the plurality of IFS values according to the corresponding numerical value; and prioritizing the devices to use the bandwidth according to an IFS policy where the devices wait at least for expiration of a period of time from a common reference before deciding the wireless network is clear for transmission, the period of time for each device being proportional to the one of the plurality of IFS values assigned thereto after being adjusted by the corresponding multiplier when applied such that at least the devices having shorter IFS values are entitled to use of the bandwidth ahead of the devices having longer IFS values.

2. The method of claim 1 further comprising implementing a request to send (RTS)/clear to send (CTS) policy in addition to the IFS policy, the RTS/CTS policy requiring one or more of the devices to execute a RTS/CTS message exchange following expiration of the period of time associated therewith prior to deciding the wireless link is clear for transmission, the RTS/CTS message exchange requiring each corresponding device to transmit a RTS message to request use of the bandwidth and to receive a CTS message granting use of the requested bandwidth prior to using the bandwidth.

3. The method of claim 2 further comprising issuing the CTS messages to the device having the shortest one of the plurality of IFS values when multiple devices are awaiting the CTS message.

4. The method of claim 3 further comprising implementing the RTS/CTS policy for the devices intending to transmit above a transmission size threshold such that the devices intending to transmit below the transmission size threshold are not subjected to the RTS/CTS policy, at least as a result of exceeding the transmission size threshold.

5. The method of claim 1 further comprising assigning each multiplier such that the numerical values for devices within the first group are less than the multipliers for devices within the second group.

6. The method of claim 5 further comprising assigning the multipliers from a priority controller located remotely from the access point and in communication with the devices through the access point.

7. The method claim 1 further comprising:
determining the first group to be a public user group and the second group to be a private user group;
associating the public user group with a first IFS value of the IFS values;
associating the private user group with a second IFS value of the IFS values, the second IFS value being shorter than the first IFS value; and
grouping each user into one of the public user group and the private user group.

8. The method of claim 7 further comprising:
identifying the users during the authentication process as a function of whether the corresponding device connects to the access point using one of a private service set identifier (SSID) and a public SSID; and
grouping the users within the private user group that connect using the private SSID and grouping the users within the public user group that connect using the public SSID.

9. The method of claim 8 further comprising controlling the access point to broadcast the private SSID and the public SSID from a single radio interface.

10. The method of claim 1 further comprising implementing a non-use policy where one or more of the multipliers are assigned values less than 1 for one or more devices having been denied access to the bandwidth for a period of time exceeding a non-use threshold.

11. The method of claim 1 further comprising assigning the multipliers to the devices intending to transmit above a transmission size threshold such that the devices intending to transmit below the predefined transmission size threshold are not assigned one of the multipliers, at least as a result of exceeding the transmission size threshold.

12. The method of claim 11 further comprising assigning the numerical values of the multipliers to be greater than or equal to 1 so as to lengthen the IFS value of the corresponding device.

13. The method of claim 12 further comprising proportionally increasing the numerical values of the multipliers as a transmission size of the intended transmission increases such that the devices associated with larger transmissions sizes are assigned greater values than the devices associated with smaller transmission sizes.

14. The method of claim 1 further comprising:
determining a first device of the devices to intend transmission of a first type of content at one point in time and to intend transmission of a second type of content at another point in time, the second type of content having a lower priority than the first type of content;
assigning the first device one of the multipliers with the numerical value being less than 1 when intending to transmit the first type of content; and
either not assigning the first device one of the multipliers or assigning the first device one of the multipliers with the numerical value being great than or equal to 1 when intending to transmit the second type of content.

15. The method claim 1 further comprising varying the numerical value of one of the multipliers assigned to one of the devices as a type of content intended for transmission from the corresponding device varies such that the multiplier is lower when a priority of the content is greater and the multiplier is greater when a priority of the content is lower.

16. The method claim 1 further comprising:
assigning a first portion of the devices successfully completing the authentication process the first IFS value;
assigning a second portion of the devices successfully completing the authentication process the second IFS value, the second IFS value differing from the first IFS value;
determining a bandwidth ratio for the wireless network at a first instance in time occurring after assigning the first and second IFS values, the bandwidth ratio indicating bandwidth consumption of the first portion of the devices relative to the second portion of the devices; and at a second instance in time occurring after the first instance in time:
i) increasing or decreasing the multiplier applied for at least one of the devices when the bandwidth ratio exceeds a threshold; and
ii) maintaining the multiplier applied for each of the devices when the bandwidth ratio fails to exceed the threshold.

17. The method claim 1 further comprising setting the numerical value for one of the one or more multipliers to be greater than the numerical value for another one of the one or more multipliers.

18. A non-transitory computer-readable medium having a plurality of non-transitory instructions sufficient to facilitate, when executed with a processor associated with an access point, prioritizing use of bandwidth of the access point when configured to facilitate wireless access for a plurality of wireless devices using at least a first wireless network and a second wireless network, the first and second wireless networks emanating from a single radio interface of the access point, wherein the non-transitory instructions are sufficient for:

prioritizing first wireless devices of the plurality of wireless devices connected to the first network to use of the bandwidth over second wireless devices of the plurality of wireless devices connected to the second network according to an interframe spacing (IFS) policy whereby the plurality of devices wait at least for expiration of a period of time from a common reference point before deciding to transmit over one of the first and second networks, including:
i) at a first instance in time, setting the period of time for the first wireless devices as a first IFS value and the period of time for the second wireless devices as a second IFS value, the second IFS value being longer than the first IFS value so as to prioritize the first wireless devices over the second wireless devices; and
ii) at a second instance in time occurring after the first instance and after at least one of the first devices communicates over the first network using the first IFS value and at least one of the second devices communicates over the second network using the second IFS value, multiplying one or more of the first and second IFS values for one or more of the first and second devices with a numerical value greater than zero in order to adjust the period of time for each corresponding device for subsequent transmissions.

* * * * *